Figure 2:
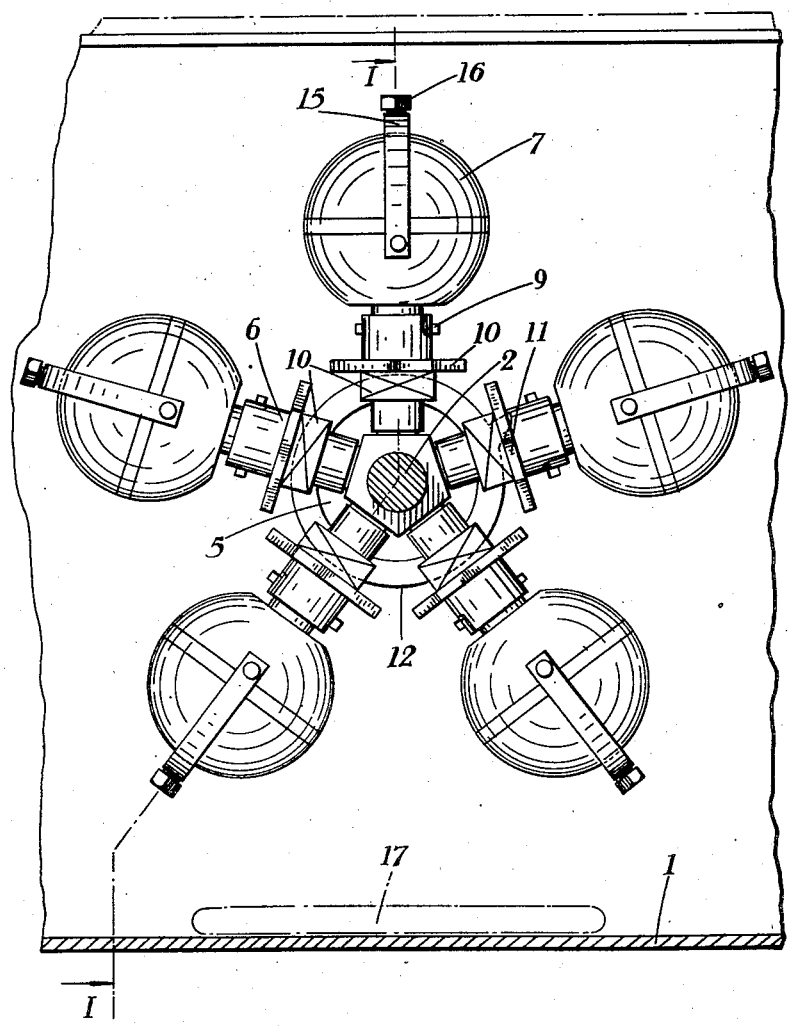

April 23, 1935.                    W. KAY                    1,998,897
MANUFACTURE OF RUBBER ARTICLES AND MACHINE FOR USE THEREIN
Filed Nov. 1, 1932                      2 Sheets-Sheet 1
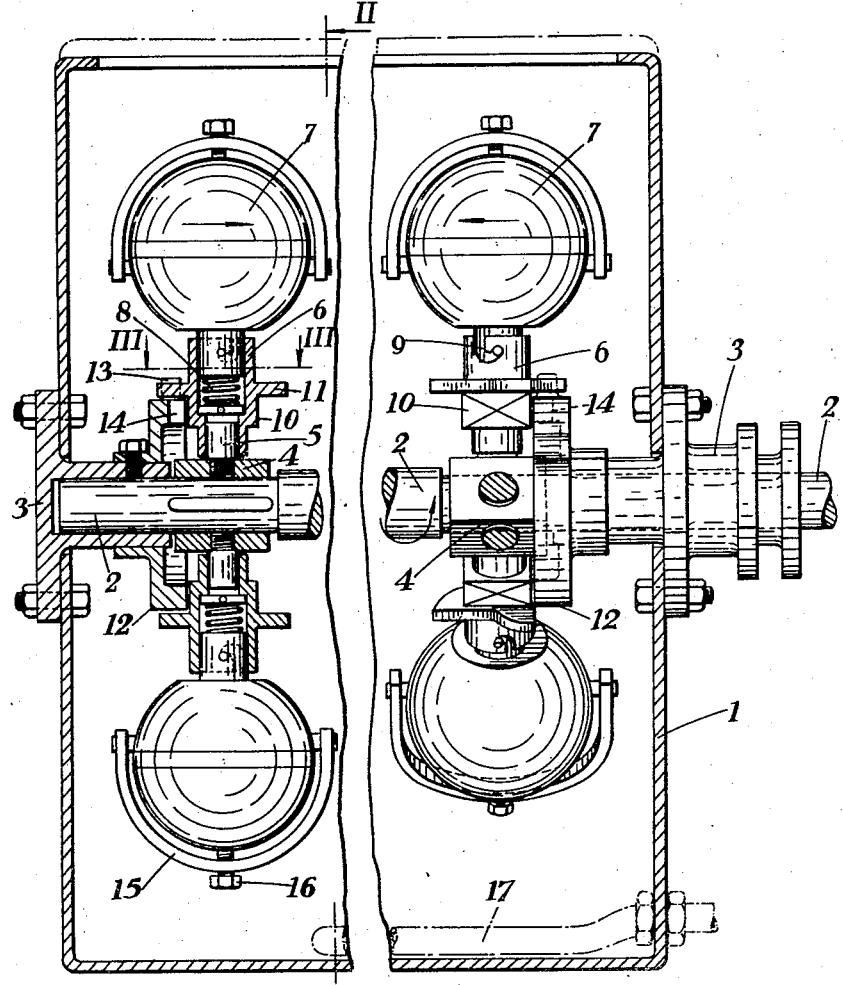
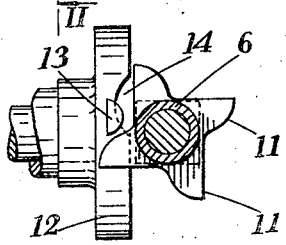
INVENTOR
WALTER KAY
BY
Gill + Jennings
ATTORNEYS Patented Apr. 23, 1935

1,998,897

UNITED STATES PATENT OFFICE 1,998,897

MANUFACTURE OF RUBBER ARTICLES AND MACHINE FOR USE THEREIN

Walter Kay, Bury, England

Application November 1, 1932, Serial No. 640,652
In Great Britain November 5, 1931

9 Claims. (Cl. 18—58)

This invention relates to the manufacture of closed hollow articles from rubber compositions, such for example as rubber balls.

Generally, rubber balls have been made from raw rubber by processes which have involved the closing of one or more seams in the ball.

The principal object of the present invention is to make a completely seamless rubber ball. Another object is to provide a machine for use in the manufacture of such a ball.

In proceeding in accordance with the present invention the necessary quantity of a mixture containing a substantial proportion of an aqueous dispersion of natural or synthetic rubber is poured into a multiple part non-porous mold, the mold is closed, and the mixture is caused to set without synæresis while the mold is slowly rotated about two different axes simultaneously. It will be appreciated that in proceeding in accordance with the invention, no charging or discharging opening is needed or formed in the article, because only the requisite amount of mixture is charged in the mold which is then completely closed and the whole of this mixture is caused to set or gel irreversibly. The rotation is so controlled as to make the wall of the hollow ball or other wholly closed article as uniform as possible. The setting is not due to precipitation on the inner wall of the heated mold, but to gelling of the latex which, after setting, is deposited on the inner wall of the mold. Any gases, such as ammonia, which are released during the setting pass into the free interior of the mold and increase the pressure of the set or gelled mixture against the inner wall. The thickness of the wall of the set or gelled article depends entirely upon the amount or concentration of the mixture poured into the mold and can thus easily be controlled.

It is to be understood that the process of the invention is essentially different from any in which a porous mold is used and the water in a latex mixture is absorbed by the pores so that a dry skin of rubber is formed, or even from a process in which heat is used to coagulate the latex. The mixture used according to the invention is sensitive in the sense that on being subjected for a sufficient time to a temperature which depends upon its composition it sets or gels irreversibly with a change of phase of its components, both the rubber and the water being continuous phases and all the water being uniformly dispersed throughout the gel. In the present process no coagulation occurs as that term is commonly understood, i. e. there is no separation of the serum from the rubber.

The expression "aqueous dispersion of natural or synthetic rubber" is intended to include rubber latex, whether concentrated or not, either natural or preserved or vulcanized or even pre-agglomerated, or an aqueous dispersion of crude or vulcanized rubber, (either reclaimed or virgin) an aqueous dispersoin manufactured by chemical synthesis from such substances as isoprene, butadiene or their homologues, and other like dispersions. Such a dispersion is rendered sensitive by the addition of a substance or mixture of substances capable of furnishing an adequate quantity of positively charged ions to effect a reversal of charge of the negatively charged rubber particles of the latex. It is preferable to use a mix which is rendered unstable by the addition of a setting agent immediately before being poured into the mold as described in my copending application Serial No. 640,650, filed November 1, 1932 but this is not essential.

The setting may be brought about by causing the molds during their rotation to dip into and come out of hot or boiling water, but if heating is used it is found that a much more uniform thickness may be imparted to the balls or other articles if the molds are rotated within a tank or other vessel containing steam. Particularly advantageously boiling water may be placed in the tank to a small depth only so that the molds do not dip into it but rotate in the atmosphere of steam given off by the water. It is found that the best results are obtained if the molds are first rotated in an open tank of this kind and then a cover is placed on the tank and the rotation continued.

In the manufacture in particular of rubber balls, it is found to be desirable to inflate the ball after it has been made, and for this purpose a plug of ordinary rubber may be inserted in the mold with the mixture. This plug will be found to adhere to the inner wall of the ball at some point and subsequent inflation can take place through it.

In general, the balls will be inflated after being dried, but according to a further feature of the invention, a ball may be inflated before being dried whether it contains a plug or not. This affords the great advantage that a ball of larger dimensions can be made from a given amount of mixture than would otherwise be the case, because it is found that in order to obtain a ball having a wall of uniform thickness there is a certain minimum amount of mixture which must be charged into the mold.

The product which is removed from the mold is microporous, and the drying must be such as to permit escape of the moisture obtained in the product before the latter becomes completely non-porous. After being dried the balls or the like are usually vulcanized and then inflated, unless inflation has taken place in the wet coagulum state. Any suitable kind of vulcanization may be used.

Advantageously, the dried and vulcanized articles may be subjected to a swelling treatment by being dipped in a rubber enamel or solution or a plain solvent, such as petrol or naphtha, which swells the material and destroys the fibrous character of the latex. Articles thus treated may advantageously be subjected to cold vulcanization by, for example, sulphur monochloride which produces a good finish without the disadvantages usual in sulphur chloride vulcanization of latex products.

The invention also includes a novel form of apparatus by means of which balls may be made. This apparatus consists essentially of a shaft carrying a number of molds radially, together with means for rotating each mold about the radius at the same time as all the molds are rotated bodily with or about the shaft. One such apparatus is illustrated by way of example in the accompanying drawings, in which Figure 1 is an elevation of the apparatus partly in section on the line I—I of Figure 2 which is a section on the line II—II of Figure 1, while Figure 3 is a section on the line III—III of Figure 1.

The apparatus illustrated is intended for use with mixtures which require the action of heat to bring about setting at the necessary speed and consists of a tank 1, containing a shaft 2 which is rotated slowly by an external source of power. This shaft 2 is carried in bearings 3 which pass through the wall of the tank 1. The shaft carries sleeves 4 each having five radial arms 5 on which sockets 6 are so mounted that they can rotate but not move longitudinally. Each of these sockets receives a light metal spherical mold 7 which is forced into the socket against a spring 8 and locked by a bayonet joint 9.

Each socket 6 has a part 10, which is square in cross-section, and four teeth or projections 11 which pass over the cylindrical surface of a collar 12 fixed to the bearing 3. During the greater part of the rotation of the shaft 2, the sockets 6 are prevented from rotating on the arms 5 by the sliding of the flat sides of the part 10 along the flat end surface of the collar 12. The latter is, however, formed with an upstanding dog 13 placed in the path of the teeth 11 and with a groove or recess 14. As each tooth comes into contact with the dog 13 once in every revolution, the socket 6 and mold 7 are turned through 90° and at the same time the recess 14 receives the edge of the part 10 of the socket and thus permits the rotation.

Each mold consists of two parts locked together by a stirrup 15 and locking screw 16. In order to make a ball, the molds are taken out of the sockets and disassembled, and a predetermined amount of a sensitive latex mixture is placed in each mold. The molds are then closed and placed in the sockets. The tank contains a shallow layer of hot water, and can be fed with steam through a pipe 17. Initially the molds are rotated for one or two minutes in the open tank, because it is found that by this method the wall of the mold becomes uniformly coated before setting proper takes place. Then a cover is placed on the tank and the rotation continued until all the mixture has set. The molds are then opened and the set spherical bodies removed.

The inflation which may take place before or after drying, or after vulcanization, is effected by means of a hollow needle through which compressed air is injected. The needle is inserted through the plug, where one is used, and the hole made by the needle may, if desired, be sealed by a small piece of soft rubber.

If a mixture is used which will set in a short time without the application of heat, the rotation about the second axis should be more uniform than is the case with a machine of the kind illustrated. For example, each socket on each radial arm may carry a bevel wheel, all the bevel wheels engaging with a fixed bevel wheel, so that the rotation is continuous about both axes of rotation.

Of course, if a mixture is used which will set sufficiently quickly in the cold, the use of a tank can be dispensed with.

The two axes about which rotation takes place need not be at right angles to one another; in particular in the case of such articles as seamless hollow toys of non-spherical form it may be desirable to rotate the molds simultaneously about two axes which are not at right angles.

It is to be understood that the invention includes the manufacture of articles which in use are not completely closed, but which are made as described and then opened. For example a rubber boot may be made in a closed mold as a completely closed seamless article and then the top of the leg portion may be cut off to provide the usual opening for the insertion of the foot.

A typical mix for use in the present process consists of:

| | |
|---|---|
| The concentrated latex sold under the trade mark "Revertex"_____grs. | 1300 |
| Zinc carbonate _____grs. | 150 |
| Sulphur _____grs. | 30 |
| Zinc diethyl dithiocarbamate_____grs. | 10 |
| Water _____cc. | 415 |

This mix is rendered unstable by the addition of 230 cc. of a 30% ammonium nitrate solution, and the resultant mixture is poured into a mold. In order to obtain the quick setting which is so desirable, the mold should be heated to, for example 80 or 90°. If, however, cold setting is desired, the proportion of the setting agent should be increased, for example by taking 380 cc. of a 71% ammonium nitrate solution.

I claim:

1. In a process for the manufacture of a hollow closed rubber article, the steps which comprise preparing a mixture containing a substantial proportion of an aqueous dispersion of natural or synthetic rubber, sensitive in the sense that, on being subjected for a sufficient time to a temperature which depends upon its composition, it sets or gels irreversibly with a change of phase of its components, both the rubber and water being continuous phases and all the water being uniformly dispersed throughout the gel, pouring into a non-porous multiple-part mold such a quantity but only that quantity of such sensitive mixture, as on setting will give an article of the size and shape desired, closing the mold, rotating the mold about two different axes simultaneously and causing setting of the mixture therein during such rotation, removing the resultant microporous article from the mold, drying the article under such conditions as to permit escape of the water in the article, whereby to render said article non-porous.

2. In a process as defined in claim 1, rotating the mold within a fluid heating medium during the setting.

3. In a process for the manufacture of a rubber ball, the steps which comprise preparing a mixture containing a substantial proportion of an aqueous dispersion of natural or synthetic rubber, sensitive in the sense that, on being subjected for a sufficient time to a temperature which depends upon its composition, it sets or gels irreversibly with a change of phase of its components, both the rubber and water being continuous phases and all the water being uniformly dispersed throughout the gel, pouring into a non-porous multiple part mold such a quantity but only that quantity of such sensitive mixture as on setting will give a ball of the size desired, closing said mold, rotating said mold about two axes at right angles simultaneously, and causing setting of the mixture therein during such rotation, removing the resultant microporous ball from the mold and drying said ball under such conditions as to permit escape of the water contained therein, whereby to render said ball non-porous.

4. In a process for the manufacture of a rubber ball, the steps which comprise preparing a mixture containing a substantial proportion of an aqueous dispersion of natural or synthetic rubber, sensitive in the sense that, on being subjected for a sufficient time to a temperature which depends upon its composition, it sets or gels irreversibly with a change of phase of its components, both the rubber and water being continuous phases and all the water being uniformly dispersed throughout the gel, pouring into a non-porous multiple part mold such a quantity but only that quantity of such sensitive mixture as on setting will give a ball of the size desired, inserting a plug in said mold, closing said mold, rotating said mold about two axes at right angles simultaneously, and causing setting of the mixture therein during such rotation, removing the resultant microporous ball from the mold, drying said ball under such conditions as to permit escape of the water contained therein, whereby to render said ball non-porous, and inflating said ball through said plug subsequently to the removal of said ball from said mold.

5. In a process for the manufacture of a rubber ball, the steps which comprise preparing a mixture containing a substantial proportion of an aqueous dispersion of natural or synthetic rubber, sensitive in the sense that, on being subjected for a sufficient time to a temperature which depends upon its composition, it sets or gels irreversibly with a change of phase of its components, both the rubber and water being continuous phases and all the water being uniformly dispersed throughout the gel, pouring into a non-porous multiple part mold such a quantity but only that quantity of such sensitive mixture, as on setting will give a ball of the size desired, inserting a plug in said mold, closing said mold, rotating said mold about two axes at right angles simultaneously, and causing setting of the mixture therein during such rotation, removing the resultant microporous ball from the mold, inflating said ball through said plug while still in a wet state, and drying said ball under such conditions as to permit escape of the water contained therein, whereby to render said ball non-porous.

6. In a process for the manufacture of a hollow closed rubber article, the steps which comprise preparing a mixture containing a substantial proportion of an aqueous dispersion of natural or synthetic rubber, sensitive in the sense that, on being subjected for a sufficient time to a temperature which depends upon its composition, it sets or gels irreversibly with a change of phase of its components, both the rubber and water being continuous phases and all the water being uniformly dispersed throughout the gel, pouring into a non-porous multiple-part mold such a quantity but only that quantity of such sensitive mixture, as on setting will give an article of the size and shape desired, closing the mold, rotating the mold about two different axes, and subjecting said article to a swelling treatment.

7. The combination of the steps claimed in claim 6 and subjecting the article to cold vulcanization subsequently to the swelling treatment.

8. In a process for the manufacture of a rubber ball, the steps which comprise preparing a mixture containing a substantial proportion of an aqueous dispersion of natural or synthetic rubber, sensitive in the sense that on being subjected for a sufficient time to a temperature which depends upon its composition, it sets or gels irreversibly with a change of phase of its components, both the rubber and water being continuous phases and all the water being uniformly dispersed throughout the gel, pouring into a non-porous multiple part mold such a quantity but only that quantity of such sensitive mixture as on setting will give a ball of the size desired, closing said mold, rotating said mold about two axes at right angles simultaneously, and causing setting of the mixture therein during such rotation, removing the resultant microporous ball from the mold, drying said ball under such conditions as to permit escape of the water contained therein, whereby to render said ball non-porous, and inflating said ball subsequently to the removal of said ball from said mold.

9. In a process for the manufacture of a rubber ball, the steps which comprise preparing a mixture containing a substantial proportion of an aqueous dispersion of natural or synthetic rubber, sensitive in the sense that on being subjected for a sufficient time to a temperature which depends upon its composition, it sets or gels irreversibly with a change of phase of its components, both the rubber and water being continuous phases and all the water being uniformly dispersed throughout the gel, pouring into a non-porous multiple part mold such a quantity but only that quantity of such sensitive mixture as on setting will give a ball of the size desired, closing said mold, rotating said mold about two axes at right angles simultaneously, and causing setting of the mixture therein during such rotation, removing the resultant microporous ball from the mold, inflating said ball while still in a wet state, and drying said ball under such conditions as to permit escape of the water contained therein, whereby to render said ball non-porous.

WALTER KAY.